US011975632B2

(12) United States Patent
Huang et al.

(10) Patent No.: US 11,975,632 B2
(45) Date of Patent: May 7, 2024

(54) POWER BATTERY HEATING SYSTEM AND CONTROL METHOD AND CONTROL CIRCUIT THEREOF

(71) Applicant: CONTEMPORARY AMPEREX TECHNOLOGY CO., LIMITED, Ningde (CN)

(72) Inventors: Xiaojian Huang, Ningde (CN); Zhimin Dan, Ningde (CN); Jinfeng Gao, Ningde (CN); Jin Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 373 days.

(21) Appl. No.: 17/563,207

(22) Filed: Dec. 28, 2021

(65) Prior Publication Data
US 2023/0041713 A1   Feb. 9, 2023

Related U.S. Application Data

(63) Continuation of application No. PCT/CN2021/110708, filed on Aug. 5, 2021.

(51) Int. Cl.
*B60L 58/27* (2019.01)
*B60L 1/02* (2006.01)
(Continued)

(52) U.S. Cl.
CPC ............ *B60L 58/27* (2019.02); *B60L 1/02* (2013.01); *B60L 50/51* (2019.02); *B60L 53/22* (2019.02);
(Continued)

(58) Field of Classification Search
CPC .. Y02T 10/70; Y02T 10/7072; H01M 10/615; H01M 2220/20
See application file for complete search history.

(56) References Cited

U.S. PATENT DOCUMENTS

2009/0128076 A1   5/2009   Taniguchi
2012/0200164 A1*  8/2012   Nakatsu ............... B60L 50/16
                                                       307/82
(Continued)

FOREIGN PATENT DOCUMENTS

CN   103560304 A   2/2014
CN   110962631 A   4/2020
(Continued)

OTHER PUBLICATIONS

Request for the Submission of an Opinion dated May 12, 2023 received in Korean Patent Application No. KR 10-2021-7040606.
(Continued)

*Primary Examiner* — Jermele M Hollington
*Assistant Examiner* — Temilade S Rhodes-Vivour
(74) *Attorney, Agent, or Firm* — Scully, Scott, Murphy & Presser, P.C.

(57) ABSTRACT

The present application provide a control method of a power battery heating system. The method includes: controlling all upper bridge arms of a first bridge arm group and all lower bridge arms of a second bridge arm group to be turned on, and controlling all lower bridge arms of the first bridge arm group and all upper bridge arms of the second bridge arm group to be turned off, so as to form a first loop; controlling all the lower bridge arms of the first bridge arm group and all the upper bridge arms of the second bridge arm group to be turned on, and controlling all the upper bridge arms of the first bridge arm group and all the lower bridge arms of the second bridge arm group to be turned off, so as to form a second loop. The method is used to heat the power battery.

20 Claims, 6 Drawing Sheets

(51) Int. Cl.
    *B60L 50/51*         (2019.01)
    *B60L 53/22*         (2019.01)
    *B60L 58/12*         (2019.01)
    *B60L 58/25*         (2019.01)
    *H01M 10/615*      (2014.01)
    *H01M 10/625*      (2014.01)
    *H01M 10/63*        (2014.01)
    *H02M 7/537*       (2006.01)

(52) U.S. Cl.
    CPC ............... *B60L 58/12* (2019.02); *B60L 58/25* (2019.02); *H01M 10/615* (2015.04); *H01M 10/625* (2015.04); *H01M 10/63* (2015.04); *H02M 7/537* (2013.01); *B60L 2210/40* (2013.01); *B60L 2240/545* (2013.01); *H01M 2220/20* (2013.01)

(56) References Cited

U.S. PATENT DOCUMENTS

| | | | |
|---|---|---|---|
| 2012/0280658 A1* | 11/2012 | Xu | H01M 10/615 320/128 |
| 2013/0003299 A1* | 1/2013 | Wissner | H05K 7/14325 361/695 |
| 2020/0212520 A1 | 7/2020 | Dan et al. | |
| 2020/0395883 A1 | 12/2020 | Iwamoto et al. | |
| 2021/0043990 A1 | 2/2021 | Dan et al. | |
| 2021/0362608 A1 | 11/2021 | Kume et al. | |

FOREIGN PATENT DOCUMENTS

| | | |
|---|---|---|
| CN | 111347937 A | 6/2020 |
| CN | 211209619 U | 8/2020 |
| CN | 112550077 A | 3/2021 |
| CN | 112550079 A | 3/2021 |
| CN | 112810467 A | 5/2021 |
| CN | 113036264 A | 6/2021 |
| CN | 113085516 A | 7/2021 |
| JP | 2003164009 A | 6/2003 |
| JP | 2009095169 A | 4/2009 |
| KR | 20200139201 A | 12/2020 |
| WO | 2020079983 A1 | 4/2020 |
| WO | 2021057339 A1 | 4/2021 |
| WO | 2021057340 A1 | 4/2021 |

OTHER PUBLICATIONS

International Search Report and Written Opinion dated Jun. 22, 2022 received in International Application No. PCT/CN2022/085823.
Extended European Search Report dated Sep. 12, 2022 received in European Patent Application No. EP 21815871.5.
Extended European Search Report dated Mar. 25, 2024 received in European Patent Application No. EP 22851602.7.

* cited by examiner

500 sending a first heating signal to the switch module, where the first heating signal is configured to control all upper bridge arms of a first bridge arm group to be turned on, all lower bridge arms of the first bridge arm group to be turned off, all lower bridge arms of the second bridge arm group to be turned on, and all upper bridge arms of the second bridge arm group to be turned off, so as to form a first loop between all upper bridge arms of the first bridge arm group, the three first windings, the three second windings, all lower bridge arms of the second bridge arm group and the power supply module ~S510 sending a second heating signal to the switch module, where the second heating signal is configured to control all lower bridge arms of the first bridge arm group to be turned on, all upper bridge arms of the first bridge arm group to be turned off, all upper bridge arms of the second bridge arm group to be turned on, and all lower bridge arms of the second bridge arm group to be turned off, so as to form a second loop between all lower bridge arms of the first bridge arm group, the three first windings, the three second windings, all upper bridge arms of the second bridge arm group and the power supply module, wherein the first loop and the second loop are configured to generate heat in a power battery by a current to heat the power battery, a spatial phase difference of the three first windings is 120°, and a spatial phase difference of the three second windings is 120° ~S520

Fig. 5

POWER BATTERY HEATING SYSTEM AND CONTROL METHOD AND CONTROL CIRCUIT THEREOF

CROSS-REFERENCE TO RELATED APPLICATIONS

This application is a continuation of International Application No. PCT/CN2021/110708, filed on Aug. 5, 2021, the disclosure of which is hereby incorporated by reference in its entirety.

TECHNICAL FIELD

The present application relates to the field of battery technology, in particular to a power battery heating system and a control method and a control circuit thereof.

BACKGROUND

Traction batteries are widely used in new energy vehicles, consumer electronics, energy storage systems and other fields due to advantages of high energy density, recyclable charging, safety and environmental protection.

However, the use of traction batteries in low-temperature environment will be subject to certain restrictions. Specifically, the discharge capacity of the power battery in low-temperature environment will be severely degraded, and the battery cannot be charged in low-temperature environment. Therefore, in order to use the power battery normally, it is necessary to heat the power battery in a low-temperature environment.

The traditional power battery heating technology may lead to the problem of excessive vibration noise of a motor in the process of heating the power battery by a motor loop.

SUMMARY

Embodiments of the present application provides a power battery heating system, a control method and a control circuit thereof, which can effectively suppress vibration noise of a motor in the process of heating a battery by a motor loop.

In a first aspect, a control method of a power battery heating system is provided. The power battery heating system includes a six-phase motor, a switch module and a power supply module. where the six-phase motor includes three first windings and three second windings, the switch module includes a first bridge arm group and a second bridge arm group, each bridge arm of the first bridge arm group and the second bridge arm group includes an upper bridge arm and a lower bridge arm, connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in a one-to-one correspondence, and the first bridge arm group and the second bridge arm group are both connected in parallel to the power supply module. The control method includes: sending a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module; where the first loop and the second loop are configured to generate heat in a power battery by a current to heat the power battery, a spatial phase difference of the three first windings is 120°, and a spatial phase difference of the three second windings is 120°.

By controlling the spatial phase difference between the three first windings of the six-phase motor into which currents flow to be 120° and the spatial phase difference between the three second windings of the six-phase motor out of which currents flow to be 120°, the vibration noise of the motor can be effectively suppressed when the loop of the six-phase motor is used to heat the power battery. In addition, the power battery heating system provided by the present application will not cause the motor to run, which can solve the problem of rotor heating in the motor, thereby prolonging the self-heating service time of the battery.

In a possible implementation, the sending a first heating signal and a second heating signal to the switch module includes: sending the first heating signal and the second heating signal to the switch module alternately at a preset frequency.

In a possible implementation, the power supply module is a power battery, and the sending a first heating signal and a second heating signal to the switch module includes: determining a state of charge (SOC) of the power battery; and sending the first heating signal and the second heating signal to the switch module if the SOC is greater than a first threshold.

When the SOC of the power battery is greater than the first threshold, that is, the power of the power battery is sufficient, the first heating signal and the second heating signal are alternately sent to the switch module to form alternating current with different current directions, and the internal resistance of the power battery is used to generate heat, thereby heating the power battery and improving the heating efficiency.

In a possible implementation, the sending a first heating signal and a second heating signal to the switch module includes: receiving, by a motor controller, a control signal sent by a vehicle control unit, the control signal being configured to indicate to heat the power battery; and sending, by the motor controller, the first heating signal and the second heating signal to the switch module according to the control signal.

In a possible implementation, the control method further includes: sending a heating stop signal to the switch module when a temperature of the power battery reaches a preset temperature and/or a temperature rise of the power battery is abnormal, the heating stop signal being configured to indicate to stop heating the power battery.

In a possible implementation, the control module is specifically configured to: acquire a working state of the six-phase motor; and send the first heating signal and the second heating signal to the switch module when the six-phase motor is in a non-working state.

By judging the working state of the motor, it is prevented that the power battery is heated when the motor is in a driving state, which may affect the performance of a power device such as a vehicle.

In a possible implementation, the control module is further configured to: receive a heating request sent by a battery management system (BMS), the heating request being configured to indicate that the power battery meets a heating condition.

By receiving the heating request sent by the BMS, the control module can heat the power battery timely to avoid affecting the use of power devices such as vehicles.

In the second aspect, a power battery heating system is provided. The power battery heating system includes a six-phase motor, a switch module, a control module and a power supply module. The six-phase motor includes three first windings and three second windings, the switch module includes a first bridge arm group and a second bridge arm group, each bridge arm of the first bridge arm group and the second bridge arm group includes an upper bridge arm and a lower bridge arm, connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in a one-to-one correspondence, and the first bridge arm group and the second bridge arm group are both connected in parallel to the power supply module. The control module is configured to: send a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and send a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module; where the first loop and the second loop are configured to generate heat in a power battery by a current to heat the power battery, a spatial phase difference of the three first windings is 120°, and a spatial phase difference of the three second windings is 120°.

In a third aspect, a control circuit of a power battery heating system is provided. The control circuit includes a processor configured to execute the control method as in the first aspect and any possible implementation thereof.

In a fourth aspect, a power device is provided. The power device includes a power battery and the power battery heating system in the second aspect.

BRIEF DESCRIPTION OF THE DRAWINGS

In order to describe the technical schemes of the embodiments of the present application more clearly, the drawings used in the embodiments of the present application will be briefly introduced below. Obviously, the drawings described below are only some embodiments of the present application, and for those of ordinary skill in the art, other drawings can be obtained according to the drawings without creative work.

FIG. 5 is a schematic block diagram of a control method of a power battery heating system provided by the embodiments of the present application;

DESCRIPTION OF EMBODIMENTS

Figure 1:
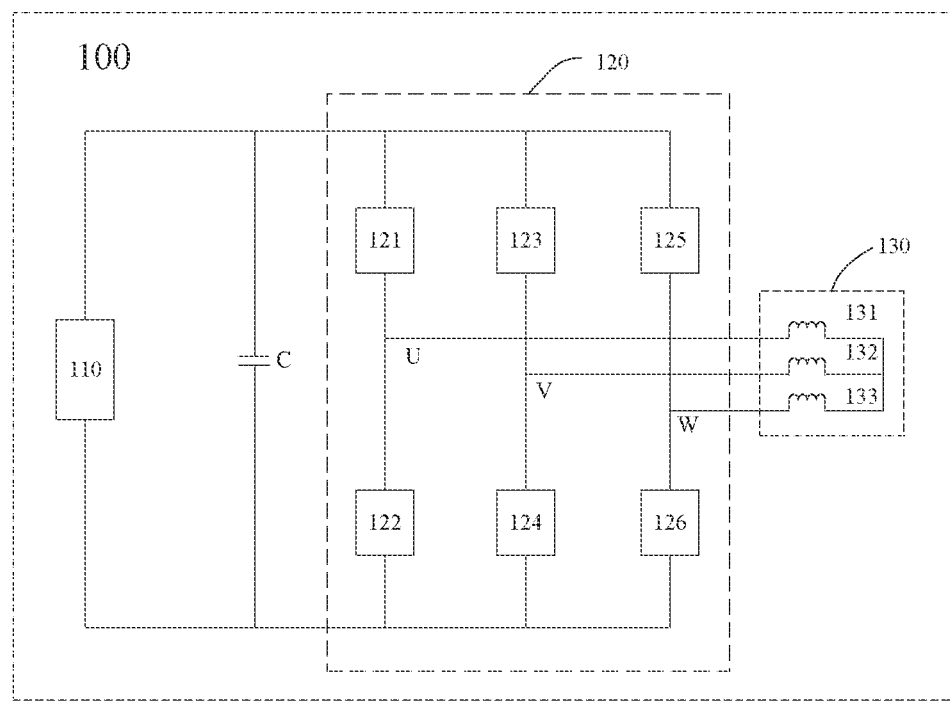
FIG. 1 is a circuit diagram of a conventional power battery heating system.

Implementations of the present application will be further described in detail with reference to the drawings and embodiments. The following detailed description of the embodiments and the drawings are intended to illustrate the principle of the present application, but are not intended to limit the scope of the present application, that is, the present application is not limited to the described embodiments.

In the description of the present application, it should be noted that, unless otherwise specified, "plurality" means two or more than two; the terms "upper", "lower", "left", "right", "inner", "outer" and the like indicate the orientation or positional relationship only for the convenience of describing the present application and simplifying the description, but do not indicate or imply that the referred device or element must have a specific orientation, be constructed and operated in a specific orientation, and therefore cannot be understood as limiting the present application. In addition, the terms "first", "second", "third" and the like are only used for descriptive purposes and cannot be understood as indicating or implying relative importance. "Vertical" does not "strictly vertical", but means that it is within an allowable range of error. "Parallel" does not mean "strictly parallel", but means that it is within an allowable range of error.

Orientation words used in the following description are all for directions shown in the drawings, and do not limit the specific structure of the present application. In the description of the present application, it should be noted that unless otherwise specified and limited, the terms "installed", "connected", and "attached" should be understood in a broad sense, for example, they may mean a fixed connection, a detachable connection or an integrated connection; they may mean a direct connection, or an indirect connection through an intermediate medium. For those of ordinary skill in the art, the specific meanings of the above terms in the present application may be understood according to specific conditions.

With the development of the times, new energy vehicles have great market prospects and can effectively promote energy conservation and emission reduction due to their environmental protection property, low voice and low use cost, and are conducive to the development and progress of society.

Due to the electrochemical characteristics of the power battery, the charging and discharging capability of the power battery is greatly limited in a low-temperature environment, which seriously affects the customer's experience of using the vehicle in winter. Therefore, in order to use the power battery normally, it is necessary to heat the power battery in the low-temperature environment.

The power battery in the embodiments of the present application may be a lithium ion battery, a lithium metal battery, a lead-acid battery, a nickel barrier battery, a nickel hydrogen battery, a lithium sulfur battery, a lithium air battery, or a sodium ion battery and the like, which are not limited here. In terms of scale, the battery in the embodiments of the present application may be a battery cell, a battery module or a battery pack, which is not limited here. In terms of application scenarios, the battery may be used in a power device such as a vehicle or a ship. For example, it may be used in an electric vehicle to supply power to the motor of the electric vehicle as the power source of the electric vehicle. The battery may also supply power to other electrical devices in the electric vehicle, such as an air conditioner and a player in the vehicle.

For convenience of description, the present application of the power battery to a new energy vehicle (electric vehicle) will be described as an example.

The driving motor and its control system are one of the core components of a new energy vehicle, and its driving characteristics determine the main performance indicators of the vehicle driving. The motor drive system of a new energy vehicle is mainly composed of an electromotor (motor), a power converter, a motor controller (for example, an inverter), various detection sensors, and a power source. The motor is a rotating electromagnetic machinery operating on the principle of electromagnetic induction, and is used to convert electrical energy to mechanical energy. During operation, it absorbs electric power from the electrical system and outputs mechanical power to the mechanical system.

In order to avoid unnecessary cost when heating the power battery, a motor loop may be used to heat the power battery.

FIG. 1 shows a circuit diagram of a conventional power battery heating system. As shown in FIG. 1, the power battery heating system 100 may include a power supply module 110, a switch module 120 connected to the power supply module 110, and a motor winding 130 connected to the switch module 120.

The power supply module 110 may be implemented not only by the power battery itself, but also by an external power supply module such as a charging pile. The heating energy provided by the external power supply module may be output by an external DC charger, or output by an external AC charger after rectification, which is not specifically limited here.

The switch module 120 may be implemented by various types of switches. For example, the switch module 120 may be implemented by an inverter in a motor driver system, where the inverter may be implemented by a bridge arm switch of an insulated gate bipolar transistor (IGBT). Specifically, the number of bridge arms of the inverter is the same as the number of windings in the motor winding 230.

For example, if the motor winding 130 includes three phases of windings, the inverter includes three phases of bridge arms, that is, a U-phase bridge arm, a V-phase bridge arm, and a W-phase bridge arm. Each of the three phases of bridge arms has an upper bridge arm and a lower bridge arm, and the upper bridge arm and the lower bridge arm are each provided with a switch unit, that is, the switch module 120 respectively includes an upper bridge arm switch 121 and a lower bridge arm switch 122 in the U-phase bridge arm, an upper bridge arm switch 123 and a lower bridge arm switch 124 in the V-phase bridge arm, and an upper bridge arm switch 125 and a lower bridge arm switch 126 in the W-phase bridge arm.

The motor winding 130 may specifically include a winding 131 connected to the U-phase bridge arm, a winding 132 connected to the V-phase bridge arm, and a winding 133 connected to the W-phase bridge arm. One end of the winding 131 is connected to a connection point of the upper bridge arm and the lower bridge arm in the U-phase bridge arm, one end of the winding 132 is connected to a connection point of the upper bridge arm and the lower bridge arm in the V-phase bridge arm, and one end of the winding 133 is connected to a connection point of the upper bridge arm and the lower bridge arm in the W-phase bridge arm. The other end of the winding 131, the other end of the winding 132, and the other end of the winding 133 are connected together.

It should be noted that the motor winding 130 is not limited to a three-phase motor, but may also be a six-phase motor, and correspondingly, the switch module 120 may include six phases of bridge arms.

In some embodiments, the current may be modulated by controlling a switch in the switch module 120 to be turned on and off periodically. For example, the current may be modulated by controlling a target upper bridge arm switch and a target lower bridge arm switch in the inverter to be turned on and off periodically. In an example, if the target upper bridge arm switch is the upper bridge arm switch 121, the target lower bridge arm switch is the lower bridge arm switch 124 and/or the lower bridge arm switch 126. In another example, if the target upper bridge arm switch is the upper bridge arm switch 123, the target lower bridge arm switch is the lower bridge arm switch 122 and/or the lower bridge arm switch 126. In another example, if the target upper bridge arm switch is the upper bridge arm switch 125, the target lower bridge arm switch is 122 and/or the lower bridge arm switch 124.

It should be noted that the target upper bridge arm switch and the target lower bridge arm switch periodically turned on and off in each cycle may be the same or different, which is not limited here. For example, the upper bridge arm switch 121 and the lower bridge arm switch 124 are controlled to be turned on and off in each cycle. For another example, in a first cycle, the upper bridge arm switch 121 and the lower bridge arm switch 124 are controlled to be turned on and off; in a second cycle, the upper bridge arm switch 123 and the lower bridge arm switch 122 are controlled to be turned on and off; in a third cycle, the upper bridge arm switch 121, the lower bridge arm switch 124 and the lower bridge arm switch 126 are controlled to be turned on and off, that is, the controlled target upper bridge arm switch and the controlled target lower bridge arm switch may be different in different cycles.

By controlling the target upper bridge arm switch and the target lower bridge arm switch to be turned on and off periodically, the current directions in different loops formed between the power supply module, the target upper bridge arm switch, the target lower bridge arm switch and the motor winding are different, thus generating alternating current, that is, the power supply module alternately performs charging and discharging.

The target conduction switch includes at least one upper bridge arm switch and at least one lower bridge arm switch. The at least one upper bridge arm switch and the at least one lower bridge arm switch are located on different bridge arms.

With the power battery heating system shown in FIG. 1, due to asymmetry of three phases of currents flowing through the motor winding and the high frequency of the currents, there is a problem of excessive vibration noise of a motor in the process of heating the power battery by a motor loop.

The embodiments of the present application provide a control method of a power battery heating system. By controlling the switch module, a loop is formed between the power supply module, the switch module and the motor winding, and a resultant magnetic field of currents flowing into the motor windings is controlled to be 0-0.5 T, thereby effectively reducing the problem of excessive vibration noise of a motor in the process of heating the power battery by a motor loop.

Figure 2:
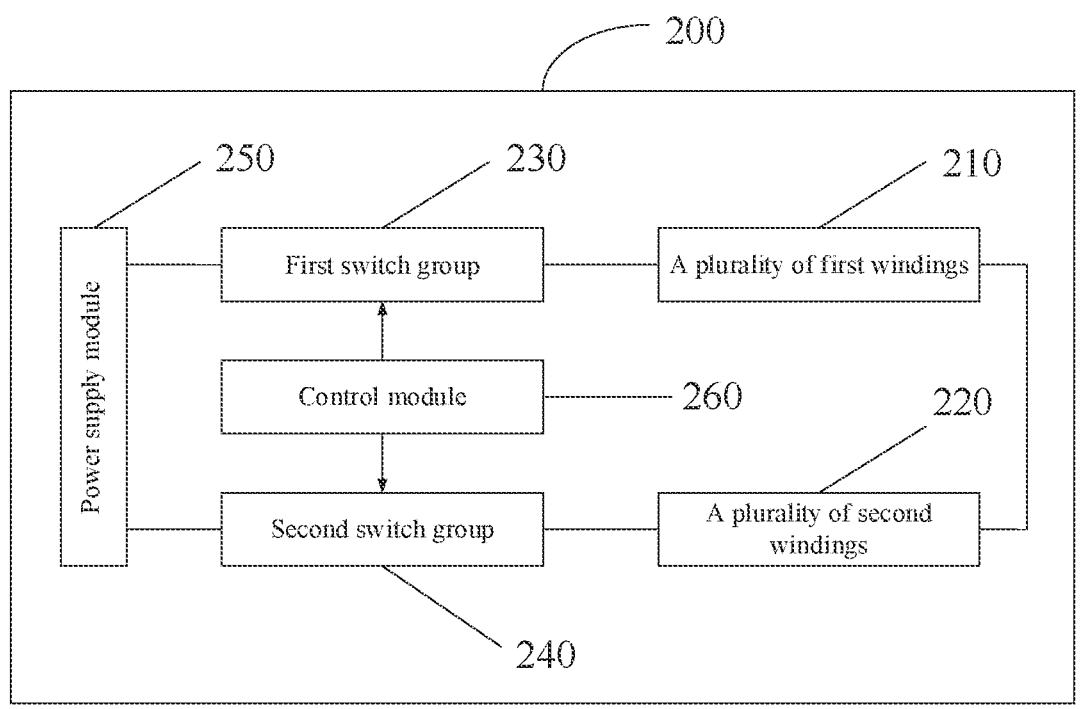
FIG. 2 is a schematic block diagram of a power battery heating system provided by the embodiments of the present application.

FIG. 2 shows a schematic block diagram of a power battery heating system 200 provided by the embodiments of the present application. As shown in FIG. 2, the power battery heating system 200 includes a plurality of first windings 210, a plurality of second windings 220, a first switch group 230, a second switch group 240, a power supply module 250, and a control module 260.

The first switch group 230 is connected to the plurality of first windings 210, and the second switch group 240 is connected to the plurality of second windings 220. It should be understood that the "connection" may mean a direct connection in a physical relationship, or may mean a connection through other devices.

The numbers of the plurality of first windings 210 and the plurality of second windings 220 are both multiples of 3, and the plurality of first windings 210 and the plurality of second windings 220 may all be windings in the first motor. For example, the first motor is a six-phase motor, the plurality of first windings 210 are three windings in the six-phase motor, and the plurality of second windings 220 are the other three windings in the six-phase motor. For another example, the first motor is a twelve-phase motor, the plurality of first windings 210 are six windings in the twelve-phase motor, and the plurality of second windings 220 are the other six windings in the twelve-phase motor.

The first switch group 230 and the second switch group 240 may be collectively referred to as a switch module, that is, the switch module includes the first switch group 230 and the second switch group 240.

The control module 260 is configured to control switching states of the first switch group 230 and the second switch group 240 to form a loop between the first switch group 230, the plurality of first windings 210, the plurality of second windings 220, the second switch group 240 and the power supply module 250, so that heat is generated by a current in the power battery to heat the power battery.

The resultant magnetic fields of the currents flowing through the plurality of first windings 210 and the plurality of second windings 220 are both 0-0.5 T.

Similar to the control method in FIG. 1, the control module 260 controls the switches in the first switch group 230 and the second switch group 240 to be turned on and off periodically, thereby generating an alternating current in loops formed between the power supply module 250, the first switch group 230, the second switch group 240, the plurality of first windings 210 and the plurality of second windings 220. For example, in the first cycle, the control module 260 controls the switches in the first switch group 230 and the second switch group 240 so that the current direction flows from the positive direction to the negative direction of the power supply module, so as to form a first loop which may also be called a discharging loop. In the second cycle, the control module 260 controls the switches in the first switch group 230 and the second switch group 240 so that the current direction flows from the negative direction to the positive direction of the power supply module, so as to form a second loop which may also be called a charging loop. The first loop and the second loop are configured to make the current generate heat in the power battery, thereby heating the power battery.

In addition, the switches in the first switch group 230 and the second switch group 240 are turned on and off periodically, that is, the switches in the first switch group 230 and the second switch group 240 are alternately turned on and off at a preset frequency.

The magnetomotive force of a single-phase winding is a pulsating magnetomotive force which is distributed in a stepped manner in space and alternated with time according to the change rule of current. The resultant magnetic field of the three phases of windings is obtained by superimposing the magnetomotive forces of the three single-phase windings in the three-phase motor. Generally, the currents flowing into the three phases of windings of a three-phase motor during heating are not completely equal in magnitude, and the currents flowing through two phases of windings thereof have a phase difference of 180°, and currents of the two phases without phase difference are equal in magnitude. It will cause the three phases of currents flowing through the motor windings to be asymmetrical with each other, and the high frequency of current will cause excessive vibration noise the motor in the heating process of the power battery. In the present application, by controlling the resultant magnetic field of currents flowing into the plurality of first windings 210 and the plurality of second windings 220 belonging to the same motor to be within a certain range, for example, 0 to 0.5 T, the vibration noise generated in the process of heating the power battery by the motor loop is effectively suppressed. At the same time, by controlling the resultant magnetic field of currents flowing into the plurality of first windings 210 and the plurality of second windings 220 belonging to the same motor to be 0 to 0.5 T, the motor does not run, and the problem of rotor heating in the motor can also be solved, thereby prolonging the self-heating service time of the battery.

Optionally, in the embodiments of the present application, the power battery heating system 200 includes a six-phase motor, a switch module, the control module 260, and a power supply module 250. The six-phase motor includes three first windings 210 and three second windings 220. The first switch group 230 in the switch module is the first bridge arm group, and the second switch group 240 in the switch module is the second bridge arm group. Each bridge arm of the first bridge arm group and the second bridge arm group includes an upper bridge arm and a lower bridge arm, and connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in one-to-one correspondence, and the first bridge arm group and the second bridge arm group are both connected in parallel to the power supply module.

The control module 260 is configured for: sending a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module. The first loop and the second loop are configured to generate heat in a power battery by a current to heat the power battery.

The spatial phase difference of the three first windings 210 is 120°, and the spatial phase difference of the three second windings 220 is 120°.

By controlling the spatial phase difference between the three first windings of the six-phase motor into which currents flow to be 120° and the spatial phase difference between the three second windings of the six-phase motor out of which currents flow to be 120°, the vibration noise of the motor can be effectively suppressed when the loop of the six-phase motor is used to heat the power battery. In addition, the power battery heating system provided by the present application will not cause the motor to run, which can solve the problem of rotor heating in the motor, thereby prolonging the self-heating service time of the battery.

Figure 3:
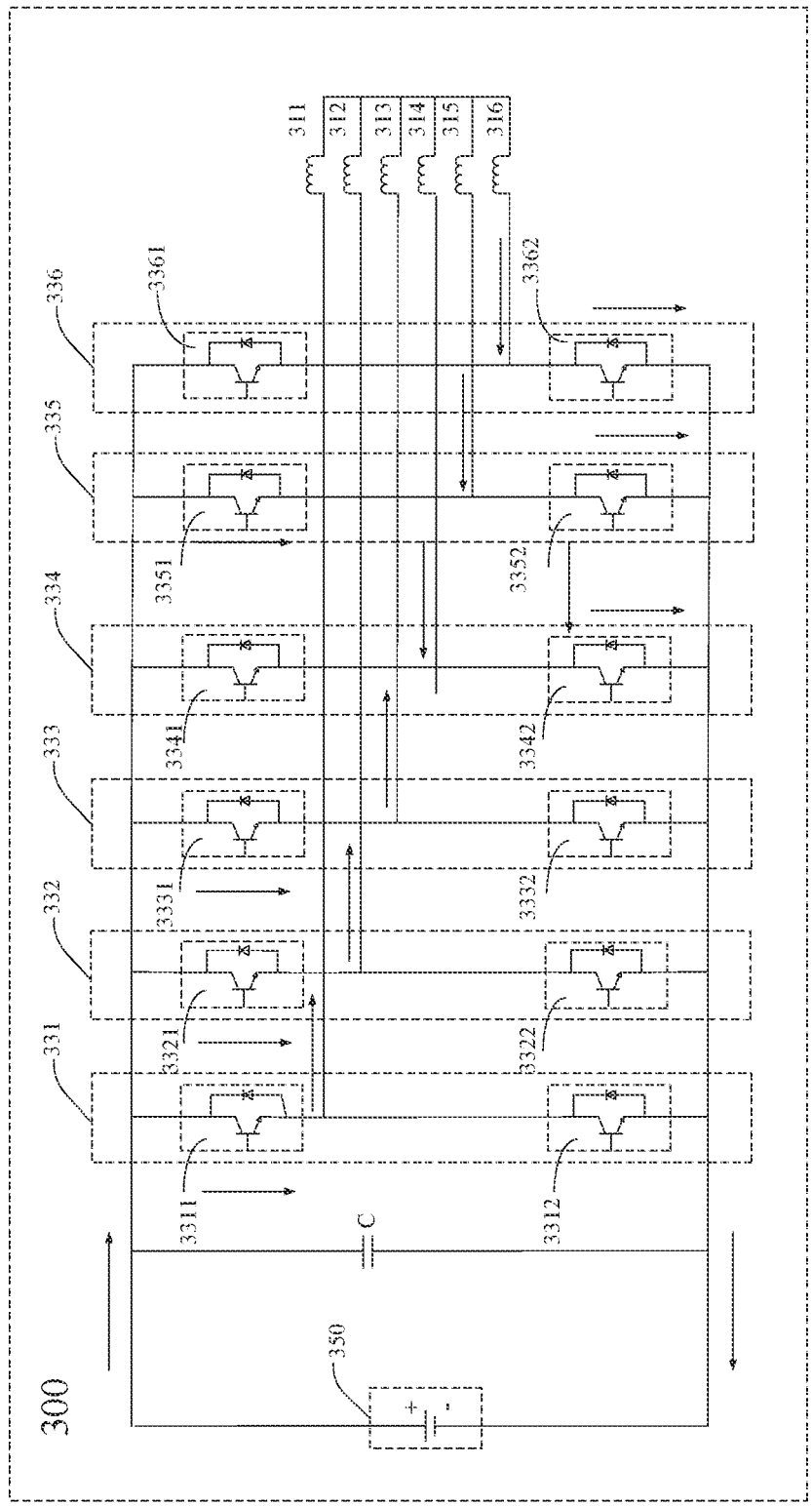
FIGS. 3 and 4 are respectively schematic diagrams of a discharging loop and a charging loop of a power battery heating system provided by the embodiments of the present application.
Figure 4:
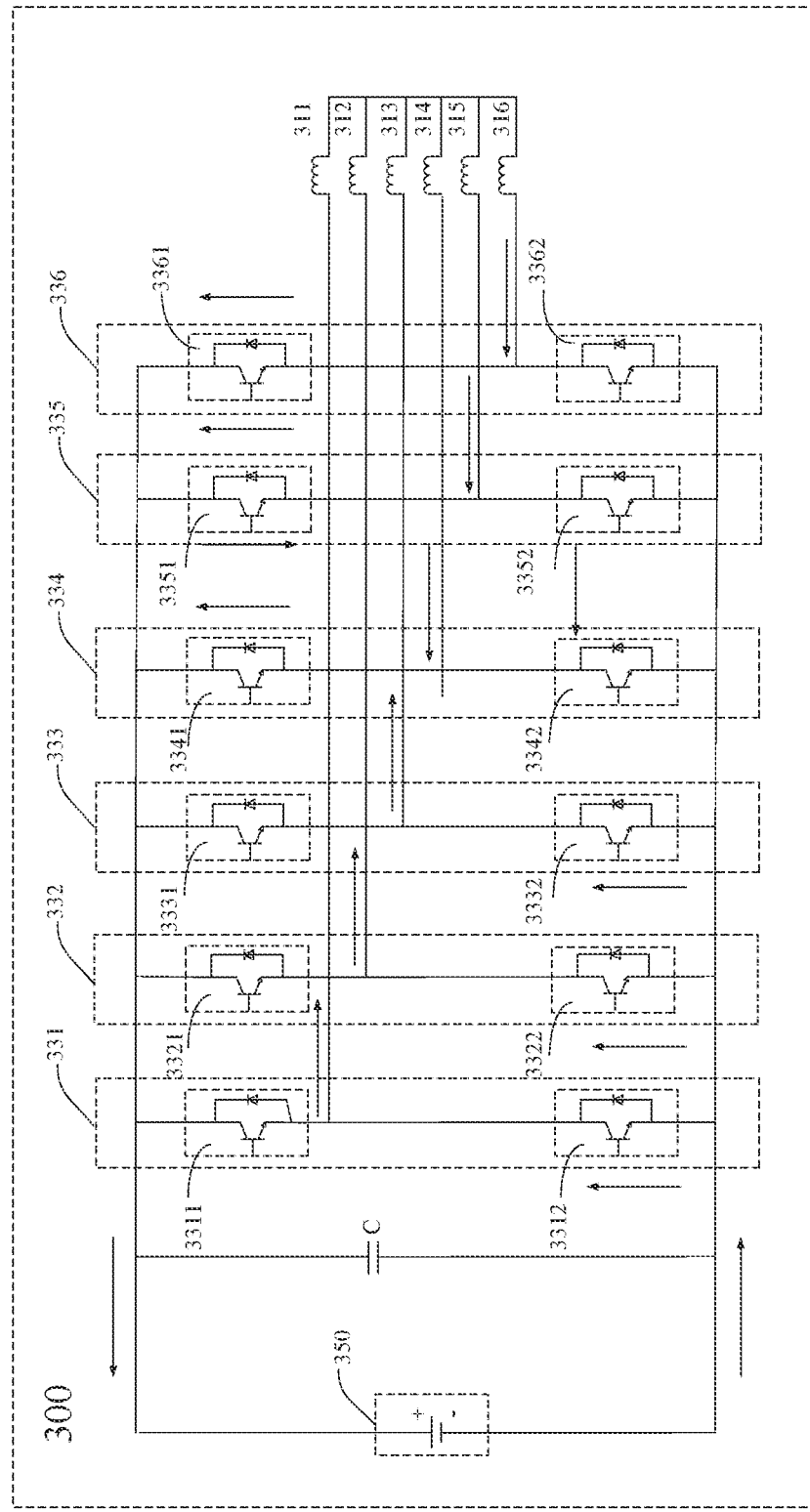

With reference to FIGS. 3 and 4, the circuit diagram of a power battery heating system 400 provided by the embodiments of the present application will be described in detail below.

As shown in FIGS. 3 and 4, the first motor is a six-phase motor, the plurality of first windings are respectively a winding 311, a winding 312, and a winding 313 in the six-phase motor; and the plurality of second windings are respectively a winding 314, a winding 315 and a winding 316 in the six-phase motor. The first bridge arm group includes a bridge arm 331, a bridge arm 332 and a bridge arm 333 in the switch module. The second bridge arm group includes a bridge arm 334, a bridge arm 335 and a bridge arm 336 in the switch module.

Specifically, a connection point of the upper bridge arm 3311 and the lower bridge arm 3312 of the bridge arm 331 is connected to one end of the winding 311, a connection point of the upper bridge arm 3321 and the lower bridge arm 3322 of the bridge arm 332 is connected to one end of the winding 312, a connection point of the upper bridge arm 3331 and the lower bridge arm 3332 of the arm 333 is connected to one end of the winding 313, a connection point of the upper bridge arm 3341 and the lower bridge arm 3342 of the bridge arm 334 is connected to one end of the winding 314, a connection point of the upper bridge arm 3351 and the lower bridge arm 3352 of the bridge arm 335 is connected to one end of the winding 315, and a connection point of the upper bridge arm 3361 and the lower bridge arm 3362 of the bridge arm 336 is connected to one end of the winding 316.

The power supply module 350, the upper bridge arms 3311 to 3331, the windings 311 to 313, the windings 314 to 316 and the lower bridge arms 3342 to 3362 together form a discharging loop, as shown in FIG. 3. Similarly, the power supply module 350, the lower bridge arms 3312 to 3332, the windings 311 to 313, the windings 314 to 316 and the upper bridge arms 3341 to 3361 together form a charging loop, as shown in FIG. 4. Under the control of the control module (not shown in the figures), the charging loop and the discharging loop are alternately turned on periodically.

In the embodiments shown in FIGS. 3 and 4, by controlling the spatial phase difference between the three windings 311 to 313 into which currents flow to be 120° and the spatial phase difference between the three windings 314 to 316 out of which currents flow to be 120°, the vibration noise of the motor can be effectively suppressed when the loop of the six-phase motor is used to heat the power battery. In addition, since the power battery heating system provided by the embodiments of the present application does not cause the motor to run, the problem of rotor heating in the motor can be solved, thereby prolonging the self-heating service time of the battery.

The windings 311 to 313 may be used as input windings, and the windings 314 to 316 may be used as output windings. Alternatively, the windings 311 to 313 may be used as output windings, and the windings 314 to 316 may be used as input windings. As long as it is ensured that the upper bridge arms of the three phases of bridge arms connected to the windings 311 to 313 and the lower bridge arms of the three phases of bridge arms connected to the windings 314 to 316 keep the switch turned on or off at the same time, and the lower bridge arms of the three phases of bridge arms connected to the windings 311 to 313 and the upper bridge arms connected to the windings 314 to 316 keep the switch turned on or off at the same time, the discharging loop shown in FIG. 3 and the charging loop shown in FIG. 4 can be implemented.

Optionally, in the embodiments of the present application, the spatial phase difference of the plurality of first windings may be a ratio of 360° to M, and the spatial phase difference of the plurality of second windings may be a ratio of 360° to N, where M is the number of the plurality of first windings, N is the number of the plurality of second windings, and (M+N) is the number of the windings of the first motors. For example, if the first motor is a twelve-phase motor, the plurality of first windings are six windings in the twelve-phase motor, and the plurality of second windings are the other six windings in the twelve-phase motor, then spatial phase difference of the six first windings is 60°, and the spatial phase difference of the six second windings is 60°.

Optionally, the control module is configured to alternately send the first heating signal and the second heating signal to the switch module at a preset frequency. That is, the control module starts timing when sending the first heating signal to the switch module, and sends the second heating signal to the switch module after a predetermined time. Next, the control module starts timing when sending the second heating signal to the switch module, and sends the first heating signal to the switch module again after a predetermined time, and then the first heating signal and the second heating signal are sent repeatedly to the switch module in turn.

Optionally, in the embodiments of the present application, the power supply module is a power battery, and the control module is further configured for: determining the SOC of the power battery; sending a first heating signal and a second heating signal to the switch module if the SOC is greater than a first threshold, in other words, the current flowing through the loop is modulated into an alternating current; and sending a third heating signal to the switch module if the SOC is less than or equal to the first threshold. The third heating signal is configured for controlling the switch in the switch module to be turned on or off, so that the current direction of the loop is constant, that is, the current flowing through the loop is modulated into a direct current, so that the heat generated by the first motor is transmitted to the power battery through the vehicle cooling system to heat the power battery.

State of charge (SOC) refers to the ratio of the remaining capacity of a battery at a certain discharge rate to the rated capacity under the same conditions. SOC is one of the important parameters of the battery management system, and it is also the basis of the charge and discharge control strategy and the battery balancing work of the whole vehicle. However, due to the complexity of the structure of the lithium battery itself, the SOC cannot be directly obtained by measuring, and can only be estimated according to some external characteristics of the battery, such as internal resistance, temperature, current and other related parameters of the battery, using relevant characteristic curves or calculation formulas.

The embodiments of the present application may be applied to the scenario of heating the power battery with lower temperature. For example, it may be applied to specific scenarios where the temperature of the power battery is increased by heating the power battery to reach the temperature at which the battery pack can be used normally. Specifically, in the embodiments of the present application, when the SOC of the power battery is greater than the first threshold, the current flowing through the loop may be modulated into an alternating current, and the power battery is heated by using the heat generated by the alternating current through the internal resistance of the power battery, thereby improving the heating efficiency. When the SOC of the battery is less than or equal to the first threshold, that is, when the battery power is insufficient, the power battery is heated by using the heat generated by the direct current in the winding, thereby reducing the power consumption and improving the flexibility of the power battery heating system.

Optionally, the control module may control the first switch group and the second switch group at the beginning so that the current flowing through the motor loop is a direct current, and periodically determine the SOC of the power battery. Once it is determined that the SOC of the power battery is greater than a first threshold, the control module controls the first switch group and the second switch group so that the current flowing through the motor loop is an alternating current, and the power battery is heated by using the heat generated by the alternating current through the internal resistance of the power battery, thereby improving the heating efficiency.

In some embodiments, the space vector control method (space vector pulse width modulation, SVPWM) algorithm may be used to modulate the current in the motor winding into direct current or alternating current.

It should be noted that when the motor winding is energized with direct current, the radial electromagnetic force of the motor will be reduced, and the eddy current loss of the motor rotor will be reduced, thereby reducing the heat generation of the rotor. Therefore, when the motor winding is energized with direct current, the heat generation and electromagnetic vibration noise of the motor rotor will be reduced.

Optionally, in the embodiments of the present application, the control module is specifically configured to obtain the working state of the first motor; and send a first heating signal and a second heating signal to the switch module when the first motor is in a non-driving state.

By judging the working state of the motor, it is prevented that the power battery is heated when the motor is in a driving state, which may affect the performance of a power device such as a vehicle.

Further, the control module is specifically configured to send the first heating signal and the second heating signal to the switch module when the first motor is in a non-driving state and the power battery heating system is fault-free.

It should be noted that, in the embodiments of the present application, the fault of the battery heating system refers to the fault of any one of the first motor, the motor controller, the switch module, and the heat conduction loop. The fault of the heat conduction loop includes but is not limited to the damage of the intercommunication valve and the lack of medium in the heat conduction loop.

Optionally, the gear information and the motor rotate speed information may be obtained, and based on this, it is judged whether the first motor is in a driving state or a non-driving state. Specifically, when it is determined that the current gear is P and the vehicle speed is 0, it indicates that the first motor is in a non-driving state. When it is determined that the current gear is not P or the vehicle speed is not 0, it indicates that the first motor is in a driving state.

It is judged according to the gear information and the motor rotate speed information, when any of the conditions is not met, the heating signal is not sent to the first motor, thus avoiding heating the power battery when the vehicle is under the normal running state and further affecting the vehicle performance.

Optionally, in the embodiments of the present application, the control module is further configured to receive a heating request sent by a battery management system (BMS). The heating request is configured to indicate that the power battery meets a heating condition.

By receiving the heating request sent by the BMS, the control module can heat the power battery timely to avoid affecting the use of power devices such as vehicles.

Optionally, in the embodiments of the present application, the control module is further configured to send a heating stop signal to the switch module when the temperature of the power battery reaches a preset temperature or the temperature rise of the power battery is abnormal, and the heating stop signal may control the switch module so that no loop is formed between the power supply module, the switch module, the three first windings and the three second windings, thereby stopping heating the power battery.

Optionally, in the embodiments of the present application, the control module may include a vehicle control unit (VCU) and/or a motor controller.

Optionally, when the vehicle control unit receives the heating request sent by the BMS, the vehicle control unit may send a control signal to the motor controller, and the control signal is configured to indicate to heat the power battery, that is, the control signal is configured to indicate the motor controller to send a heating signal to the switch module. For example, after receiving the control signal sent by the vehicle control unit, the motor controller may send a first heating signal to the switch module, the first heating signal is configured to control the switch module, so that a first loop is formed between the power supply module, the switch module, the three first windings and the three second windings. After a predetermined time, the motor controller sends a second heating signal to the switch module, the second heating signal is configured to control the switch module, so that a second loop is formed between the power supply module, the switch module, the three first windings and the three second windings. The currents in the first loop and the second loop are in opposite directions, and the currents flow into the three first windings and then flow out of the three second windings sequentially.

Optionally, the power battery heating system shown in FIGS. 3 and 4 further includes a capacitor c connected in parallel to the power supply module. The capacitor C mainly plays a role in stabilizing voltage and filtering out clutters, etc.

Figure 6:
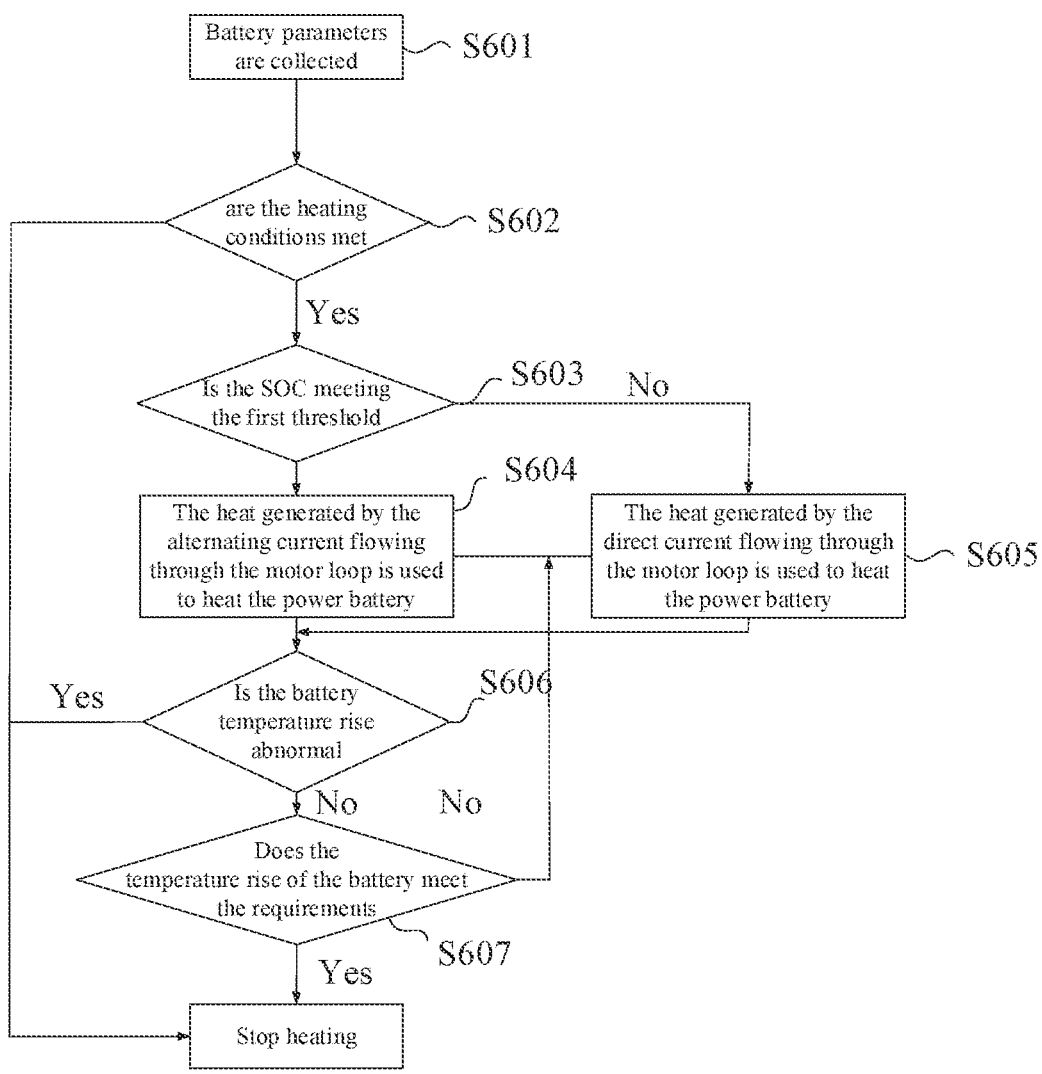
FIG. 6 is a schematic flowchart of a control method of a power battery heating system provided by the embodiments of the present application.

The power battery heating system according to the embodiments of the present application has been described in detail above, and the control method of the power battery heating system according to the embodiments of the present application will be described in detail with reference to FIGS. 5 and 6. Technical features described in the device embodiments are applicable to the following method embodiments.

FIG. 5 shows a schematic block diagram of a control method 500 of a power battery heating system according to the embodiments of the present application. The power battery heating system is any of the power battery heating systems described above. The control method 500 may be executed by a control module in the power battery heating system, for example, a vehicle control unit and/or a motor controller, and the control method 500 includes:

S510, sending a first heating signal to the switch module, where the first heating signal is configured to control all upper bridge arms of a first bridge arm group to be turned on, all lower bridge arms of the first bridge arm group to be turned off, all lower bridge arms of the second bridge arm group to be turned on, and all upper bridge arms of the second bridge arm group to be turned off, so as to form a first loop between all upper bridge arms of the first bridge arm group, the three first windings, the three second windings, all lower bridge arms of the second bridge arm group and the power supply module; and S520, sending a second heating signal to the switch module, where the second heating signal is configured to control all lower bridge arms of the first bridge arm group to be turned on, all upper bridge arms of the first bridge arm group to be turned off, all upper bridge arms of the second bridge arm group to be turned on, and all lower bridge arms of the second bridge arm group to be turned off, so as to form a second loop between all lower bridge arms of the first bridge arm group, the three first windings, the three second windings, all upper bridge arms of the second bridge arm group and the power supply module.

The first loop and the second loop are configured to generate heat in a power battery by a current to heat the power battery, a spatial phase difference of the three first windings is 120°, and a spatial phase difference of the three second windings is 120°.

Specifically, in the embodiments of the present application, when the vehicle control unit judges that the power battery meets the heating conditions, it may send a control signal to the motor controller. The control signal is configured to indicate to heat the power battery, and then the motor controller sends a first heating signal to the switch module.

The first heating signal controls all upper bridge arms of the first bridge arm group, the three first windings, the three second windings, all lower bridge arms of the second bridge arm group and the power supply module to form a first loop. The motor sends a second heating signal to the switch module at a predetermined time after sending the first heating signal, and the second heating signal controls all lower bridge arms of the first bridge arm group, the three first windings, the three second windings, all upper bridge arms of the second bridge arm group and the power supply module to form a second loop.

Optionally, in the embodiments of the present application, the sending a first heating signal and a second heating signal to the switch module includes: sending the first heating signal and the second heating signal to the switch module alternately at a preset frequency. That is, the first loop and the second loop are alternately formed.

Optionally, in the embodiments of the present application, the power supply module is a power battery, and the sending a first heating signal and a second heating signal to the switch module includes: determining a state of charge (SOC) of the power battery; and sending the first heating signal and the second heating signal to the switch module if the SOC is greater than a first threshold.

Optionally, in the embodiments of the present application, the sending a first heating signal and a second heating signal to the switch module includes: acquiring a working state of the six-phase motor; and sending the first heating signal and the second heating signal to the switch module when the six-phase motor is in a non-driving state.

Optionally, in the embodiments of the present application, the control method further includes: sending a heating stop signal to the switch module when the temperature of the power battery reaches a preset temperature, or the temperature rise of the power battery is abnormal.

Next, the control method of the power battery heating system according to the embodiments of the present application will be described in detail by taking the power battery heating system 300 shown in FIGS. 3 and 4 as examples respectively. FIG. 6 shows a schematic flowchart of the control method 600. As shown in FIG. 6, the control method 600 includes the following steps.

S601, the BMS collects battery parameters such as temperature, SOC, voltage signal and current signal of battery pack.

S602, the BMS judges whether the heating conditions are met according to various parameters of the battery, and if yes, the BMS sends a corresponding heating request to the VCU according to the SOC state, for example, the BMS sends the required electric power for heating to a preset temperature to the VCU.

S603, the BMS or VCU judges whether the SOC of the battery is greater than a first threshold.

S604, if the SOC is greater than the first threshold, heat generated by the alternating current flowing through the motor loop is used to heat the power battery.

S605, if the SOC is less than or equal to the first threshold, heat generated by the direct current flowing through the motor loop is used to heat the power battery.

After S604, the VCU reads the current working state of the first motor.

For example, if the first motor is in a driving state (i.e., working state), the VCU sends a driving signal to the motor controller. At this time, the motor controller sends a periodic driving signal to the switch module to control the upper bridge arms and the lower bridge arms of the bridge arms 331 to 336 to switch on and off according to the periodic driving signal sent by the motor controller, thus realizing the inverter control of the battery current. If the first motor is in a non-driving state, the VCU sends a control signal to the motor controller. At this time, the motor controller sends the first heating signal and the second heating signal to the switch module, so as to alternately control the upper bridge arms of the bridge arms 331 to 333 and the lower bridge arms of the bridge arms 334 to 336, the lower bridge arms of the bridge arms 331 to 333 and the upper bridge arms of the bridge arms 334 to 336 to keep switched on and off at the same time.

Specifically, when the upper bridge arms 3311, 3321 and 3331 of the bridge arms 331 to 333 and the lower bridge arms 3342, 3352 and 3362 of the bridge arms 334 to 336 are turned on, and the lower bridge arms 3312, 3322 and 3332 of the bridge arms 331 to 333 and the upper bridge arms 3341, 3351 and 3361 of the bridge arms 334 to 336 are turned off, the battery 350 is discharged, and the discharging loop is: 350(+)→(3311/3321/3331)→(311/312/313)→(314/315/316) (3342/3352/3362)→350(−). The current state is shown in FIG. 3. When the lower bridge arms 3312, 3322 and 3332 of the bridge arms 331 to 333 and the upper bridge arms 3341, 3351, and 3361 of the bridge arms 334 to 336 are turned on, and the upper bridge arms 3311, 3321 and 3331 of the bridge arms 331 to 333 and the lower bridge arms 3342, 3352, 3362 of the bridge arms 334 to 336 are turned off, the battery 350 is charged, and the charging loop is: 350(−)→(3312/3322/3332)→(311/312/313)→(314/315/316)→(3341/3351/3361)→350(+). The current state is shown in FIG. 4.

S606, the BMS judges whether the temperature of the battery pack is abnormal, and if yes, it sends information of abnormal temperature rise to the VCU, and the VCU forwards the information of abnormal temperature rise to the motor controller to stop heating.

S607, if it is judged that the temperature rise is not abnormal in S606, the BMS judges whether the temperature of the battery pack meets the requirements, if yes, the VCU forwards the information of stop heating to the motor controller to stop heating; otherwise, S604/S605 and S606 are repeated.

Figure 7:
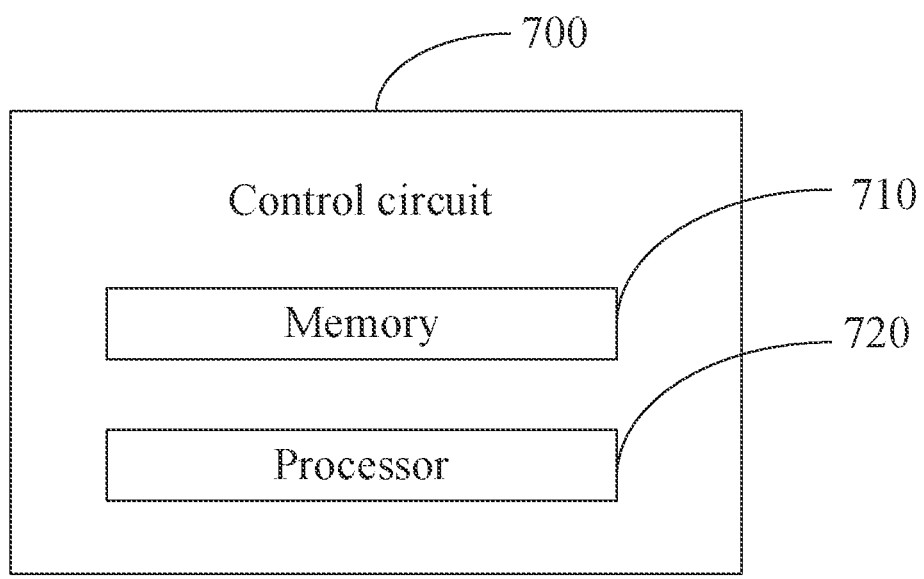
FIG. 7 is a schematic structural diagram of a control circuit of a power battery heating system provided by the embodiments of the present application.

FIG. 7 shows a schematic block diagram of a control circuit 700 of a power battery heating system according to the embodiments of the present application. As shown in FIG. 7, the control circuit 700 includes a processor 720. Optionally, the control circuit 700 further includes a memory 710. The memory 710 is configured to store instructions, and the processor 720 is configured to read the instructions and execute the methods of aforementioned various embodiments of the present application based on the instructions.

Optionally, the processor 720 corresponds to a control module in any of the above-mentioned power battery heating systems.

Optionally, the embodiments of the present application further provide a power device. The power device includes a power battery and any one of the power battery heating systems. The power battery heating systems are configured to heat the power battery, and the power battery provides power for the power device.

Optionally, the power device is an electric vehicle.

The embodiments of the present application further provide a readable storage medium for storing a computer program. The computer program is configured to execute the methods of the aforementioned various embodiments of the present application.

Those of ordinary skill in the art may be aware that the units and algorithm steps of each example described in combination with the embodiments disclosed herein can be implemented in electronic hardware, or a combination of computer software and electronic hardware. Whether these functions are implemented in hardware or software depends on the specific application and design constraints of the technical scheme. Technicians may use different methods to implement the described functions for each specific application, but such implementation should not be considered beyond the scope of the present application.

Those skilled in the art can clearly understand that, for the convenience and conciseness of description, the specific working processes of the systems, devices and units described above may refer to the corresponding processes in the aforementioned method embodiments, which will not be repeated here.

In the provided embodiments of the present application, it should be understood that the disclosed system, device, and method may be implemented in other ways. For example, the device embodiments described above are only illustrative. For example, the division of the units is only a logical function division, and there may be other divisions in actual implementation, for example, a plurality of units or components may be combined or may be integrated into another system, or some features may be ignored or not implemented. In addition, the mutual coupling or direct coupling or communication connection shown or discussed may be indirect coupling or communication connection through some interfaces, devices or units, and may be in electrical, mechanical or other forms.

The units described as separate components may or may not be physically separated, and the components displayed as units may or may not be physical units, that is, they may be located in one place or distributed to a plurality of network units. Some or all of the units may be selected according to actual needs to achieve the objects of the embodiments.

In addition, each functional unit in each embodiment of the present application may be integrated into one processing unit, or each unit may physically exist separately, or two or more units may be integrated into one unit.

The functions may be stored in a computer readable storage medium if they are implemented in the form of software functional units and sold or used as independent products. Based on this understanding, in essence, an essential part of the technical schemes of the present application, or a part thereof that contributes to the prior art, or a part of the technical schemes may be embodied in the form of a software product, and the computer software product is stored in a storage medium, and includes a number of instructions to make a computer device (which may be a personal computer, a server, or a network device and the like) execute all or part of the steps of the method described in the various embodiments of the present application. The aforementioned storage media include U disk, mobile hard disk, read-only memory (ROM), random access memory (RAM), magnetic disk or optical disk, and other media that may store program codes.

The above are only specific implementations of the present application, but the protection scope of the present application is not limited to this. Any person skilled in the art can easily think of changes or substitutions within the technical scope disclosed in the present application. These changes or substitutions shall fall within the protection scope of the present application. Therefore, the protection scope of the present application shall be subject to the protection scope of the claims.

What is claimed is:

1. A control method of a power battery heating system, wherein:
the power battery heating system comprises a six-phase motor, a switch module and a power supply module;
wherein the six-phase motor comprises three first windings and three second windings, the switch module comprises a first bridge arm group and a second bridge arm group, each bridge arm of the first bridge arm group and the second bridge arm group comprises an upper bridge arm and a lower bridge arm, connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in a one-to-one correspondence, and the first bridge arm group and the second bridge arm group are both connected in parallel to the power supply module; and
the control method comprises:
sending a first heating signal to the switch module, wherein the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and
sending a second heating signal to the switch module, wherein the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module;
wherein the first loop and the second loop are configured to generate heat in a power battery by a current to heat the power battery, a spatial phase difference of the three first windings is 120°, and a spatial phase difference of the three second windings is 120°.

2. The control method according to claim 1, wherein the sending a first heating signal and a second heating signal to the switch module comprises:
sending the first heating signal and the second heating signal to the switch module alternately at a preset frequency.

3. The control method according to claim 1, wherein the power supply module is the power battery, and the sending a first heating signal and a second heating signal to the switch module comprises:
determining a state of charge (SOC) of the power battery; and
sending the first heating signal and the second heating signal to the six-phase motor under the condition that the SOC is greater than a first threshold.

4. The control method according to claim 1, wherein the sending a first heating signal and a second heating signal to the switch module comprises:
receiving, by a motor controller, a control signal sent by a vehicle control unit, the control signal being configured to indicate to heat the power battery; and
sending, by the motor controller, the first heating signal and the second heating signal to the switch module according to the control signal.

5. The control method according to claim 1, wherein the control method further comprises:
sending a heating stop signal to the switch module under the condition that a temperature of the power battery reaches a preset temperature and/or a temperature rise of the power battery is abnormal, the heating stop signal being configured to indicate to stop heating the power battery.

6. The control method according to claim 1, wherein the sending a first heating signal and a second heating signal to the switch module comprises:
acquiring a working state of the six-phase motor; and
sending the first heating signal and the second heating signal to the switch module under the condition that the six-phase motor is in a non-driving state.

7. The control method according to claim 1, wherein the control method further comprises:
receiving a heating request sent by a battery management system (BMS), the heating request being configured to indicate that the power battery meets a heating condition.

8. A control circuit of a power battery heating system, wherein the power battery heating system comprises a six-phase motor, a switch module and a power supply module; wherein the six-phase motor comprises three first windings and three second windings, the switch module comprises a first bridge arm group and a second bridge arm group, each bridge arm of the first bridge arm group and the second bridge arm group comprises an upper bridge arm and a lower bridge arm, connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in a one-to-one correspondence, and the first bridge arm group and the second bridge arm group are both connected in parallel to the power supply module;
wherein the control circuit comprises a processor and a memory, wherein the memory stores instructions which, when is executed by the processor, cause the control circuit to:
send a first heating signal to the switch module, wherein the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and
send a second heating signal to the switch module, wherein the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module;

wherein the first loop and the second loop are configured to generate heat in a power battery by a current to heat the power battery, a spatial phase difference of the three first windings is 120°, and a spatial phase difference of the three second windings is 120°.

9. The control circuit according to claim 8, wherein the instructions further cause the control circuit to:
send the first heating signal and the second heating signal to the switch module alternately at a preset frequency.

10. The control circuit according to claim 8, wherein the power supply module is the power battery, and the processor is configured to:
determine a state of charge (SOC) of the power battery; and
send the first heating signal and the second heating signal to the switch module under the condition that the SOC is greater than a first threshold.

11. The control circuit according to claim 8, wherein the instructions further cause the control circuit to:
receive, by a motor controller, a control signal sent by a vehicle control unit, the control signal being configured to indicate to heat the power battery; and
send, by the motor controller, the first heating signal and the second heating signal to the switch module according to the control signal.

12. The control circuit according to claim 8, wherein the instructions further cause the control circuit to:
send a heating stop signal to the switch module under the condition that a temperature of the power battery reaches a preset temperature and/or a temperature rise of the power battery is abnormal, the heating stop signal being configured to indicate to stop heating the power battery.

13. The control circuit according to claim 8, wherein the instructions further cause the control circuit to:
acquire a working state of the six-phase motor; and
send the first heating signal and the second heating signal to the switch module under the condition that the six-phase motor is in a non-driving state.

14. The control circuit according to claim 8, wherein the instructions further cause the control circuit to:
receive a heating request sent by a battery management system (BMS), the heating request being configured to indicate that the power battery meets a heating condition.

15. A storage medium, configured to store instructions which, when executed by a computing apparatus, cause the computing apparatus to implement a method to control a power battery heating system;
wherein the power battery heating system comprises a six-phase motor, a switch module and a power supply module; wherein the six-phase motor comprises three first windings and three second windings, the switch module comprises a first bridge arm group and a second bridge arm group, each bridge arm of the first bridge arm group and the second bridge arm group comprises an upper bridge arm and a lower bridge arm, connection points of the upper bridge arm and the lower bridge arm of each bridge arm of the first bridge arm group are connected to the three first windings in a one-to-one correspondence, connection points of the upper bridge arm and the lower bridge arm of each bridge arm of the second bridge arm group are connected to the three second windings in a one-to-one correspondence, and the first bridge arm group and the second bridge arm group are both connected in parallel to the power supply module; and
wherein the method comprises:
sending a first heating signal to the switch module, wherein the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, the three first windings, the three second windings, all the lower bridge arms of the second bridge arm group and the power supply module; and
sending a second heating signal to the switch module, wherein the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, the three first windings, the three second windings, all the upper bridge arms of the second bridge arm group and the power supply module;
wherein the first loop and the second loop are configured to generate heat in a power battery by a current to heat the power battery, a spatial phase difference of the three first windings is 120°, and a spatial phase difference of the three second windings is 120°.

16. The storage medium according to claim 15, wherein the method further comprises:
sending the first heating signal and the second heating signal to the switch module alternately at a preset frequency.

17. The storage medium according to claim 15, wherein the power supply module is the power battery, and the method further comprises:
determining a state of charge (SOC) of the power battery; and
sending the first heating signal and the second heating signal to the switch module under the condition that the SOC is greater than a first threshold.

18. The storage medium according to claim 15, wherein the method further comprises:
receiving, by a motor controller, a control signal sent by a vehicle control unit, the control signal being configured to indicate to heat the power battery; and
sending, by the motor controller, the first heating signal and the second heating signal to the switch module according to the control signal.

19. The storage medium according to claim 15, wherein the method further comprises:
sending a heating stop signal to the switch module under the condition that a temperature of the power battery reaches a preset temperature and/or a temperature rise of the power battery is abnormal, the heating stop signal being configured to indicate to stop heating the power battery.

20. The storage medium according to claim 15, wherein the method further comprises:
   acquiring a working state of the six-phase motor; and
   sending the first heating signal and the second heating signal to the switch module under the condition that the six-phase motor is in a non-driving state.

* * * * *